United States Patent
Koizumi et al.

(10) Patent No.: US 11,674,824 B2
(45) Date of Patent: Jun. 13, 2023

(54) MEASUREMENT DEVICE COMPRISING A CYLINDRICAL HOUSING HAVING A FIRST SUBSTRATE WITH A LIGHT RECEIVING UNIT DISPOSED ON AN EXTENSION OF THE ONE END OF A FIBER IN THE HOUSING

(71) Applicant: Biologging Solutions Inc., Tokyo (JP)

(72) Inventors: Takuya Koizumi, Tokyo (JP); Takuji Noda, Tokyo (JP)

(73) Assignee: Biologging Solutions Inc., Tokyo (JP)

( * ) Notice: Subject to any disclaimer, the term of this patent is extended or adjusted under 35 U.S.C. 154(b) by 330 days.

(21) Appl. No.: 17/207,886

(22) Filed: Mar. 22, 2021

(65) Prior Publication Data
US 2021/0207980 A1    Jul. 8, 2021

Related U.S. Application Data

(63) Continuation of application No. PCT/JP2019/033842, filed on Aug. 29, 2019.

(30) Foreign Application Priority Data

Sep. 20, 2018  (JP) .............................. JP2018-176081

(51) Int. Cl.
 *G01D 11/24*  (2006.01)
 *G01D 5/26*   (2006.01)
 *G01D 11/30*  (2006.01)
(52) U.S. Cl.
 CPC ............. *G01D 5/268* (2013.01); *G01D 11/30* (2013.01)

(58) Field of Classification Search
 CPC ........ G01D 11/24; G01D 11/28; G01D 11/26; G01D 5/00
 USPC ................................. 250/227.11, 227.14, 239
 See application file for complete search history.

(56) References Cited

U.S. PATENT DOCUMENTS

| | | | |
|---|---|---|---|
| 2006/0247724 | A1 | 11/2006 | Gerber et al. |
| 2013/0274567 | A1 | 10/2013 | Grosser et al. |
| 2014/0161398 | A1* | 6/2014 | Yi .............................. G02B 6/36 385/92 |
| 2016/0206215 | A1 | 7/2016 | Takahashi et al. |

FOREIGN PATENT DOCUMENTS

| | | |
|---|---|---|
| JP | 2013-539692 | 10/2013 |
| JP | 2016-131733 | 7/2016 |

OTHER PUBLICATIONS

WIPO, International Search Report in corresponding PCT application PCT/JP2019/033842, dated Nov. 19, 2019.

* cited by examiner

*Primary Examiner* — Que Tan Le
(74) *Attorney, Agent, or Firm* — Ryan Alley IP

(57) ABSTRACT

A measurement device has a sensor and includes a cylindrical housing, an optical fiber that is disposed along the long-side direction of the housing and that has one end disposed in the housing and the other end disposed outside the housing, a first substrate including a light receiving unit disposed on an extension of the one end in the housing, and a second substrate that is electrically connected to the first substrate via a flexible part having flexibility and is disposed at an acute angle or a right angle with respect to the first substrate.

5 Claims, 8 Drawing Sheets

MEASUREMENT DEVICE COMPRISING A CYLINDRICAL HOUSING HAVING A FIRST SUBSTRATE WITH A LIGHT RECEIVING UNIT DISPOSED ON AN EXTENSION OF THE ONE END OF A FIBER IN THE HOUSING

RELATED APPLICATIONS

This application claims priority under 35 U.S.C. § 120 to, and is a continuation of, co-pending International Application PCT/JP2019/033842, filed Aug. 29, 2019 and designating the US, which claims priority to Japanese Application 2018-176081, filed Sep. 20, 2018, such Japanese Application also being claimed priority to under 35 U.S.C. § 119. These Japanese and International applications are incorporated by reference herein in their entireties.

FIELD

The embodiments discussed herein relate to a measurement device.

BACKGROUND

To measure the behavior, physiology, and experience environment of a wildlife creature, there has been known a biologging and biotelemetry technique in which a measurement device with various kinds of sensors is attached directly to the creature and the measurement is performed. For example, in biologging, measurement data is stored in a measurement device, whereas in biotelemetry, measurement data is sent from a measurement device to the outside wirelessly or via another communications pathway so that the measurement data is remotely collected.

The measurement device is made up of a battery, an electronic substrate on which a sensor, memory, wireless terminal, and others are mounted, and a housing (a case made of a resin, a metal, or another, or an entity having equivalent capabilities to the case) that covers them.

Recently, electronic substrates with high functionality have been demanded to enable such a measurement device to obtain various kinds of information. To this end, the number of components mounted on the substrates and the sizes of the components are increased. Consequently, the sizes of the substrates and the number of constituent substrates are increased.

As a means to downsize an electronic device, there has been known that, in an electronic device that includes a battery storing container having an opening for storing and taking out a battery, a recording medium storing part for storing a recording medium in a detachable manner, and a plurality of circuit boards on which prescribed circuity is formed, the recording medium storing part and the plurality of circuit boards are placed in an area except the opening at the outside of the battery storing container so as to surround the battery storing container.

Please see, for example, Japanese Laid-open Patent Publication No. 2004-39845.

In the biologging and biotelemetry technique, downsizing of a measurement device is demanded for alleviating stress on a creature, caused by the attachment of the measurement device to the creature. A suitable shape of the housing of the measurement device depends on a creature to which the measurement device is attached. For example, the suitable shape may be a shape that alleviates the stress or a shape for easy detachment.

In addition, a measurement device with high pressure resistance and waterproof performance is demanded for water creatures. For example, a substrate and battery may be placed at the same time in the housing, and a resin may be applied to fill the free space (where the substrate and battery do not exist) in the housing.

Since a measurement device with anti-shock property and waterproof performance is demanded for land creatures, a substrate and battery may be placed at the same time or independently in the housing, and a resin or the like may be applied. If a pressure sensor, connector, and others are embedded in the resin, however, they do not function. To avoid this, these sensor, connector, and others are exposed from the housing.

In addition to the pressure sensor and connector, there are sensors, such as an illumination sensor, whose positions with respect to the housing are restricted.

To summarize the above, the following objectives that are difficult to achieve at the same time are desired to be achieved: the size of a measurement device including the housing is reduced although the substrate area may be increased to achieve high functionality; and the measurement device has a shape suitable for a creature to which the measurement device is attached. In addition, the configuration of a substrate is complicated due to sensors and connectors whose positions with respect to the housing are restricted.

SUMMARY

According to one aspect, there is provided a measurement device including a sensor. The measurement device includes: a cylindrical housing; an optical fiber disposed along a long-side direction of the housing, the optical fiber having one end disposed in the housing and another end disposed outside the housing; a first substrate including a light receiving unit disposed on an extension of the one end in the housing; and a second substrate disposed at an acute angle or a right angle with respect to the first substrate.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION

Hereinafter, a measurement device according to some embodiments will be described in detail with reference to the accompanying drawings.

Embodiment

As examples of how to attach a measurement device to a fish, there are internal attachment where the measurement device is placed in the abdominal cavity of the fish and external attachment where the measurement device is attached to the body surface of the fish. In the external attachment, a metal wire, a nylon string, a cable tie, or the like may be put through the body for the attachment. In most cases, this external attachment is probably inappropriate for long-term attachment because the fluid resistance increases and a wound at the attachment area festers. For this reason, the internal attachment is generally considered more appropriate for long-term attachment to fish.

Figure 1:
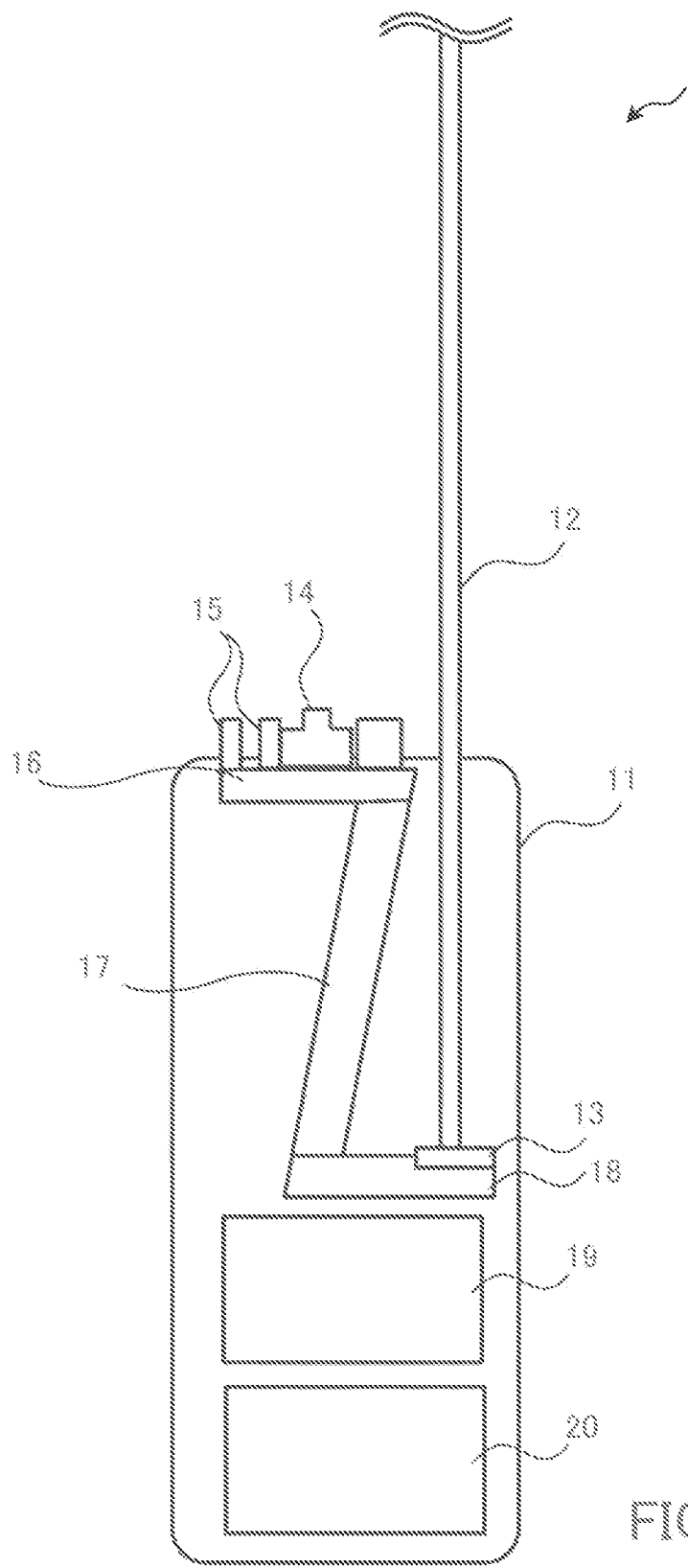
FIG. 1 illustrates a measurement device according to one embodiment.

FIG. 1 illustrates a measurement device according to one embodiment.

The measurement device 1 of the embodiment includes sensors that measure the behavior and physiology, experience environment, and others of a wildlife creature. Specifically, the measurement device 1 of the embodiment includes a housing 11, an optical fiber 12, an illuminance sensor 13, a pressure sensor 14, connectors 15, substrates 16, 17, and 18, and batteries 19 and 20.

The housing 11 has a cylindrical shape with rounded corners. The rounded corners are able to avoid damage to the abdominal cavity of a fish. For example, the housing 11 has a diameter of approximately 8 mm and a long-side length of 30 mm. The housing 11 is not limited to the above-described shape as long as it has a hollow cylindrical shape. For example, the housing 11 may be formed by joining one hemisphere to one end of a cylinder or may be formed in a capsule shape by joining two hemispheres to both ends of a cylinder.

The housing 11 is filled with a transparent or opaque resin, not illustrated, and a part of the optical fiber 12, a part of the pressure sensor 14, and parts of the connectors 15 are exposed to the outside of the housing 11. Although the inside of the housing 11 may actually be opaque, FIG. 1 illustrates the inside of the housing 11, for convenience of explanation, so as to allow easy understanding of the configuration of the measurement device 1.

Figure 2:
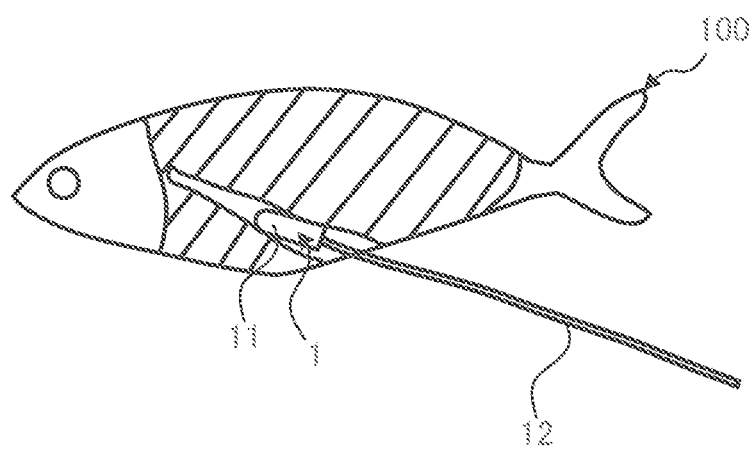
FIG. 2 is a view for explaining an example of how to use the measurement device according to the embodiment.

FIG. 2 is a view for explaining an example of how to use the measurement device according to the embodiment.

As illustrated in FIG. 2, the housing 11 is inserted into the abdominal cavity of a fish 100 and is attached thereto (internal attachment). In the case of the internal attachment, the measurement device 1 is entirely placed inside the fish 100. In this case, it is difficult to measure the environmental illuminance outside the fish 100 using the measurement device 1.

To deal with this, a part of the optical fiber 12 is exposed to the outside of the fish 100 while the housing 11 is attached to the inside of the fish 100.

The optical fiber 12 takes in external light into the housing 11. This makes it possible to measure the environmental illuminance outside the fish 100, inside the housing 11 placed in the abdominal cavity of the fish.

Refer back to FIG. 1.

The illuminance sensor 13 is mounted on the substrate 18. The illuminance sensor 13 measures the intensity (light intensity) of light captured by the optical fiber 12. For example, Lotek Wireless Inc. provides LAT2510 and others in which a similar optical fiber is exposed to the outside of a fish and the illuminance is measured on a substrate within a housing placed in the abdominal cavity of the fish. Lotek Wireless Inc., however, does not arrange substrates in Z-shape, unlike the present embodiment. Therefore, Lotek Wireless Inc. provides models totally different from the measurement device 1 of the embodiment.

The pressure sensor 14 is mounted on the substrate 16. The pressure sensor 14 measures the pressure of the inside of the abdominal cavity of the fish 100.

By the way, in the measuring device 1, the illuminance sensor 13 and pressure sensor 14 are disposed at predetermined positions so that the illuminance sensor 13 and pressure sensor 14 are able to achieve correct measurement.

Specifically, it is preferable that, to enable the illuminance sensor 13 to perform measurement to reflect a sufficient environmental illuminance, a light receiving unit of the illuminance sensor 13 receives light from the optical fiber 12 as directly as possible. However, the optical fiber 12 has restrictions in bending without changing its light transmission characteristics.

Therefore, in order to connect the optical fiber 12 to the cylindrical housing 11 and apply light directly to the light receiving unit of the illuminance sensor 13 on the substrate 18 placed in the housing 11, the optical fiber 12 is inserted in the housing 11 from the upper surface of the housing 11 as viewed in FIG. 1, and the substrate 18 having the illuminance sensor 13 mounted thereon is placed as parallel to the end face of the optical fiber 12 as possible.

When the housing 11 is filled with a resin, the pressure sensor 14 is exposed to the outside of the resin. In the case where the pressure sensor 14 is exposed to the outside of the housing 11, it is preferable to dispose the pressure sensor 14 on the upper surface or the lower surface (the end surface in the long-side direction of the housing 11) of the housing 11. To this end, it is preferable to dispose the substrate 16 on which the pressure sensor 14 is mounted, close to the upper surface or the lower surface of the housing 11. Referring to FIG. 1, the substrate 16 is disposed close to the upper surface of the housing 11. The connectors 15 are mounted on the substrate 16 for connecting the measurement device 1 to a personal computer (PC) to perform measurement settings and download of measurement data. The connectors 15 are also exposed to the outside of the housing 11. In the embodiment, the connectors 15 are used for the connection to the PC. Alternatively, the PC may perform wireless communication with the measurement device 1 using Bluetooth (registered trademark) or the like to perform such measurement settings, download of measurement data, and others.

The substrate 17 has, for example, functions such as a microcomputer and a memory for use in biologging and biotelemetry.

In the embodiment, in order to place the illuminance sensor 13, the pressure sensor 14, and the connectors 15 in the cylindrical housing 11 such as to comply with their positional restrictions and arrange the substrates having other functions for use in the measurement in the limited space of the housing 11, the substrates 16, 17 and 18 are arranged in Z-shape in a side view.

Figure 3:
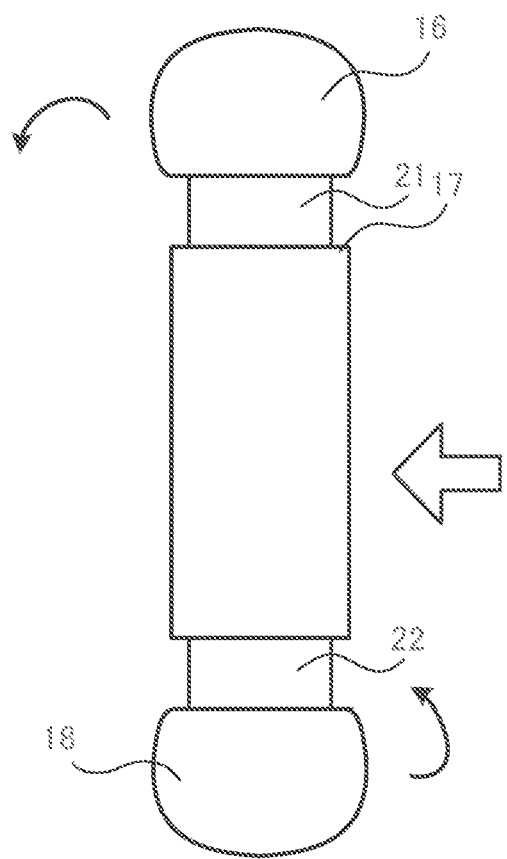
FIG. 3 is a view for explaining the arrangement of substrates.

FIG. 3 is a view for explaining the arrangement of substrates.

Note that the illuminance sensor 13, the pressure sensor 14, and the connectors 15 are not illustrated in FIG. 3.

The substrates 16, 17, and 18 are electrically connected to one another via flexible parts 21 and 22.

The flexible parts 21 and 22 are examples of a flexible component. The flexible parts 21 and 22 are flexible substrates or rigid flexible substrates.

The flexible part 21 electrically connects the substrates 16 and 17. The flexible part 22 electrically connects the substrates 17 and 18.

The flexible part 21 is bent toward the front side of the paper sheet, and the flexible part 22 is bent toward the back side of the paper sheet. When viewed from the direction of the white arrow (side direction), the substrates 16, 17, and 18 have a Z-shape as shown in FIG. 1. That is, the substrate 16 is disposed at an acute angle with respect to the substrate 17 in the side view. The substrate 18 is disposed at an acute angle with respect to the substrate 17 in the side view.

In the embodiment, the substrates 16, 17, and 18 are arranged in the Z-shape in the side view. Alternatively, the substrates 16, 17, and 18 may be arranged so as to form right angles (to have a U-shape) in the side view. To arrange the substrates 16, 17, and 18 in the Z-shape in the side view, connectors may be used in place of the flexible parts.

Refer back to FIG. 1.

The batteries 19 and 20 supply power to elements and circuits mounted on the substrates 16, 17 and 18. Examples of the batteries 19 and 20 include a button battery SR626. The number of batteries is not limited to the specific value illustrated, but may be one or three or more.

In the case of placing the measuring device 1 inside the abdominal cavity of the fish 100, it is preferable that the diameter of the cylindrical housing 11 is small in order to alleviate the stress on the fish 100.

An increase in the diameter of the housing 11 by only several millimeters may increase the death rate, depending on the type and size of the fish. However, it is difficult to contain substrates having functions used for biologging and biotelemetry, such as not only sensors but also a power supply, microcomputer, memory, and others, in a circle with a limited diameter, in view of the sizes and number of components. On the other hand, the long-side length of the cylinder, even if it is large, may probably not affect the stress on the fish, as compared with the diameter.

As described above, the measurement device 1 including sensors for measuring the behavior and physiology, experience environment, and others of a wildlife creature is placed inside the fish 100 and has the cylindrical housing 11 with rounded corners, the optical fiber 12 disposed along the long-side direction of the housing 11 and having one end disposed in the housing and the other end disposed outside the fish 100, the substrate 18 having mounted thereon the illuminance sensor 13 having the light receiving unit disposed on an extension of the one end in the housing 11, and the substrate 17 connected to the substrate 18 via the flexible part 22 having flexibility and disposed at an acute angle or a right angle with respect to the substrate 18.

That is, such structure and configuration that the substrates 16, 17, 18 are connected to one another using the flexible parts 21 and 22 and the flexible parts 21 and 22 are bent make it possible to densely contain the substrates with high functionality in a limited space.

As described above, it is possible to achieve substrates with high functionality, reduce the overall size of the measurement device 1 including the housing 11, and form the measurement device 1 in a shape suitable for an attachment to a creature. In addition, it is possible to place sensors and connectors whose positions with respect to the housing 11 are restricted, at appropriate positions. That is, it is possible that the substrates 16, 17, and 18 having functions used in measurement form a substrate that is long in the long-side direction and fits the diameter of the housing 11.

As a result, it is possible to arrange substrates that have a large area in total in a limited space. In addition, since the large substrate area allows many circuits to be formed on the substrates, it is possible to achieve the measurement device 1 with many functions while reducing the size of the measurement device 1.

The following describes modification examples of the measurement device 1.

First Modification Example

With regard to a first modification example of the measurement device, the following mainly describes differential features from the above-described measurement device 1, and the description of the same features will be omitted. In the following description, a collection of substrates disposed in a measurement device is referred to as "a substrate unit." For example, the substrate unit of the measurement device 1 includes substrates 16, 17, and 18 and flexible parts 21 and 22.

Figure 4A:
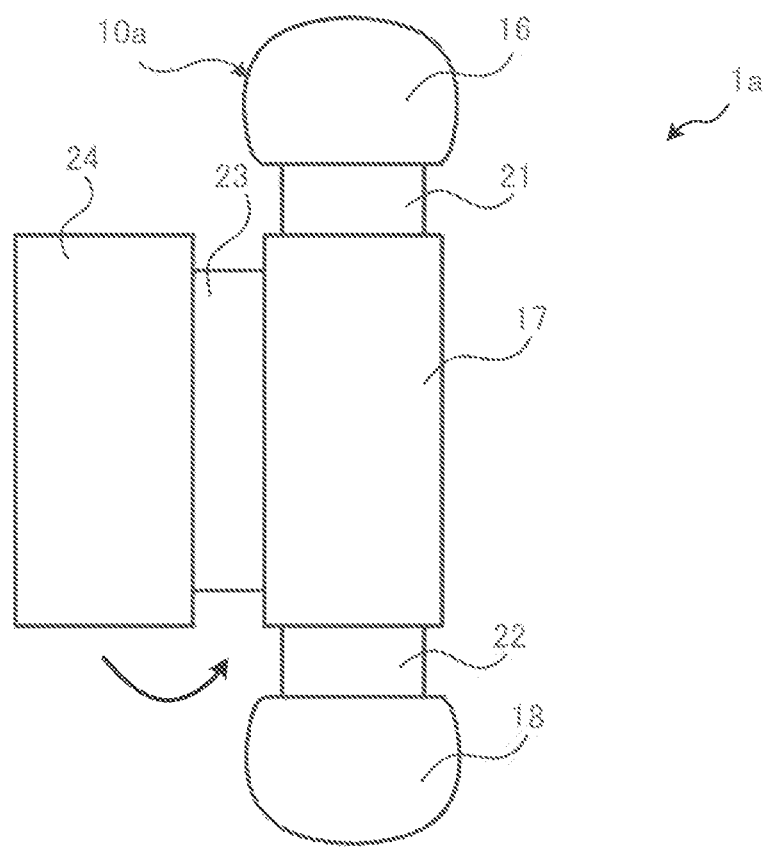
FIGS. 4A and 4B illustrate a first modification example of the measurement device according to the embodiment.
Figure 4B:
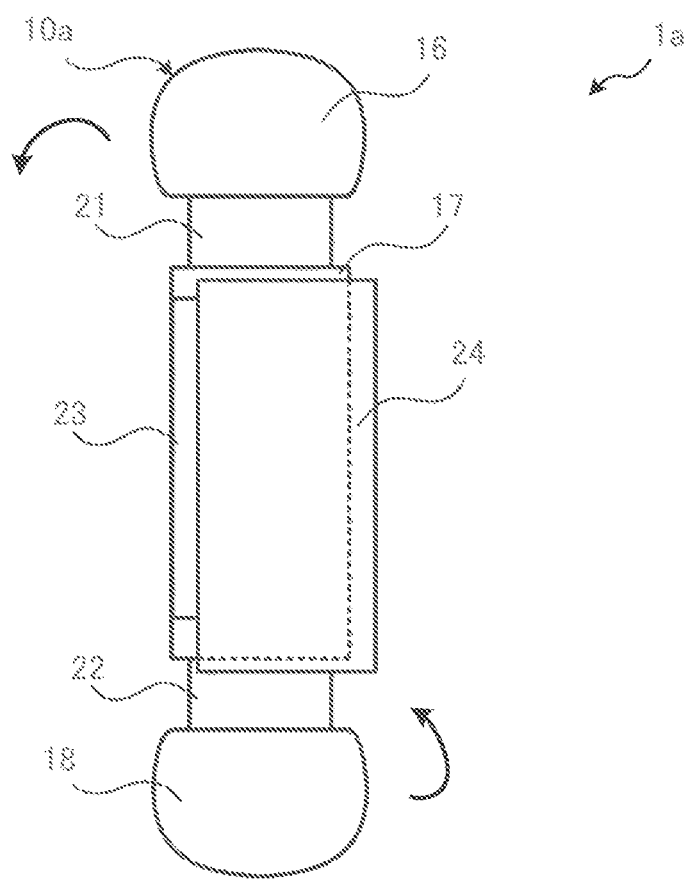

FIGS. 4A and 4B illustrate the first modification example of the measurement device according to the embodiment.

The measurement device 1a illustrated in FIGS. 4A and 4B differs from the measurement device 1 in the configuration of substrates. More specifically, as illustrated in FIG. 4A, a substrate unit 10a of the first modification example additionally includes a flexible part 23 and a substrate 24. The substrate 24 is connected to the substrate 17 via the flexible part 23.

To contain this substrate unit 10a in the housing 11, the flexible part 23 is bent so that the substrate 24 overlaps almost completely with the substrate 17 in a plan view, as illustrated in FIG. 4B.

Then, as with the measurement device 1, the flexible part 21 is bent toward the front side of the paper sheet and the flexible part 22 is bent toward the back side of the paper sheet. By doing so, the substrate unit 10a has a Z-shape as viewed from the right side (side direction) of the paper sheet, as illustrated in FIG. 1.

The measurement device 1a of the first modification example provides the same effects as the measurement device 1. In addition, the measurement device 1a has an increased substrate area in the housing 11. Therefore, it is possible to mount more sensors and increase the memory capacity so as to achieve the measurement device 1a with higher functionality.

Second Modification Example

With regard to a second modification example of the measurement device, the following mainly describes differential features from the above-described measurement device 1a, and the description of the same features will be omitted.

Figure 5:
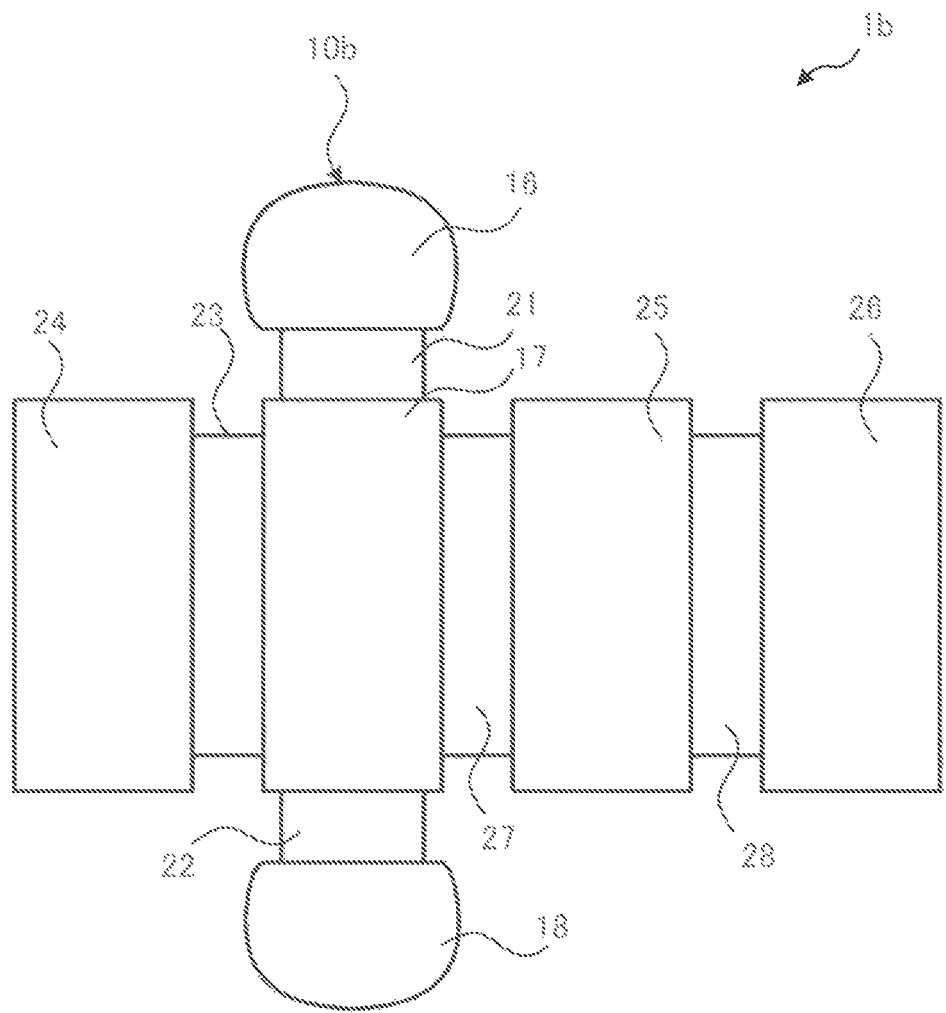
FIG. 5 illustrates a second modification example of the measurement device according to the embodiment.

FIG. 5 illustrates the second modification example of the measurement device according to the embodiment.

The measurement device 1b of the second modification example illustrated in FIG. 5 differs from the measurement device 1a in the configuration of substrates. Specifically, as illustrated in FIG. 5, the substrate unit 10b of the second modification example additionally includes substrates 25 and 26 and flexible parts 27 and 28. The substrate 25 is connected to the substrate 17 via the flexible part 27, and the substrate 26 is connected to the substrate 25 via the flexible part 28.

To contain the substrate unit 10b in the housing 11, the flexible parts 23, 27, and 28 are bent so that the substrates 17, 24, 25, and 26 form the periphery of a cylinder. By doing so, the substrates 24 and 25 face each other, and the substrates 17 and 26 face each other. Then, the flexible parts 21 and 22 are bent so that the substrates 16 and 18 cover the top and bottom of the cylinder.

The measurement device 1b of the second modification example provides the same effects as the measurement device 1a. In addition, the measurement device 1b has an increased substrate area in the housing 11.

Third Modification Example

With regard to a third modification example of the measurement device, the following mainly describes differential features from the above-described measurement device 1b, and the description of the same features will be omitted.

Figure 6:
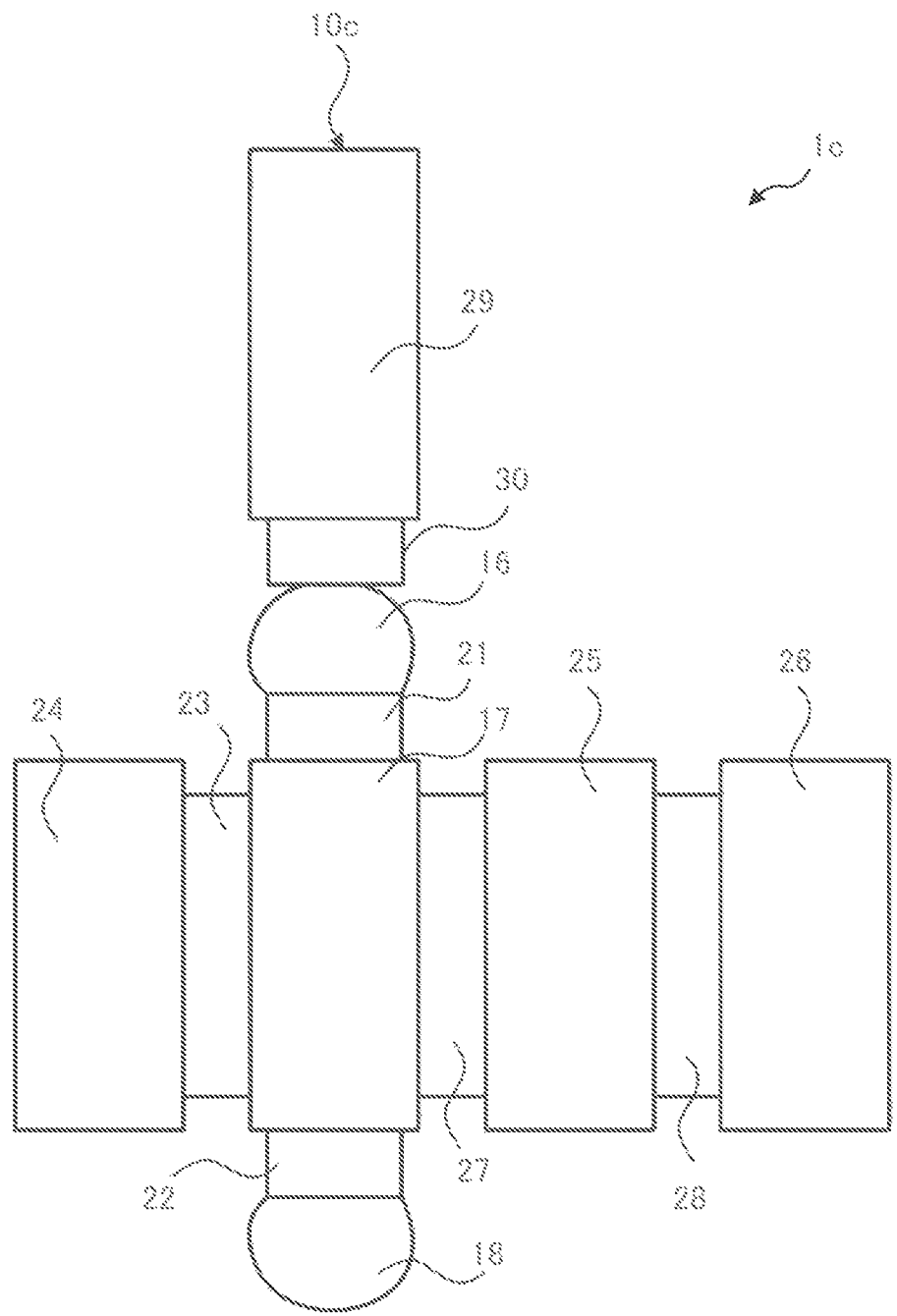
FIG. 6 illustrates a third modification example of the measurement device according to the embodiment.

FIG. 6 illustrates a third modification example of the measurement device according to the embodiment.

The measurement device 1c of the third modification example illustrated in FIG. 6 differs from the measurement device 1b in the configuration of substrates. Specifically, as illustrated in FIG. 6, the substrate unit 10c of the third modification example additionally includes a substrate 29 and a flexible part 30. The substrate 29 is connected to the substrate 16 via the flexible part 30.

To contain the substrate unit 10c in the housing 11, the flexible parts 23, 27, and 28 are bent so that the substrates 17, 24, 25, and 26 form the periphery of a cylinder. In addition, the flexible parts 21 and 22 are bent so that the substrates 16 and 18 cover the top and bottom of the cylinder. Then, the flexible part 30 is bent so that the substrate 29 overlaps with the substrate 17.

Since the substrates overlap via the flexible parts, it is possible to dispose the substrates with six or more surfaces in a relatively small space.

Second Embodiment

With regard to a measurement device according to a second embodiment, the following mainly describes differential features from the above-described measurement device 1, and the description of the same features will be omitted.

The first embodiment describes the measurement device 1 in which the batteries 19 and 20 are disposed under the substrates, by way of example. Alternatively, a battery may be surrounded by a substrate unit 10a, 10b, or 10c that is bent as in the first to third modification examples.

Figure 7:
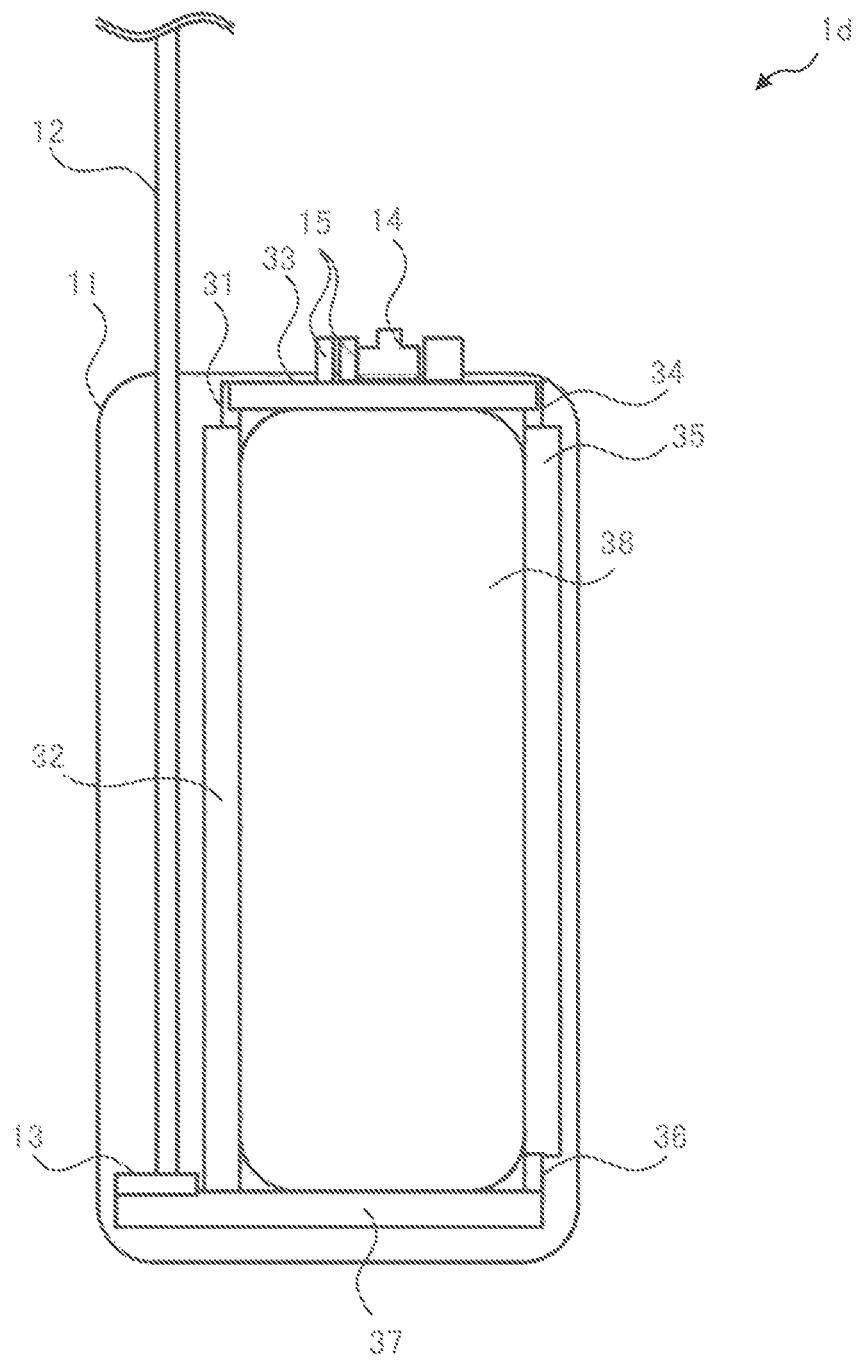
FIG. 7 illustrates a measurement device according to a second embodiment.

FIG. 7 illustrates a measurement device according to the second embodiment.

The measurement device 1d of the second embodiment includes substrates 32 and 33 that are electrically connected via a flexible part 31. The substrate 33 is further electrically connected to a substrate 35 via a flexible part 34. The substrate 35 is further electrically connected to a substrate 37 via a flexible part 36. The flexible parts 31, 34, and 36 are bent so that the substrates 32, 33, 35, and 37 having functions for use in measurement surround a battery 38 in a housing 11.

An illuminance sensor 13 is disposed at the left end of the substrate 37. An optical fiber 12 is inserted into the housing 11 from the upper surface of the housing 11 as viewed in FIG. 7, and the substrate 37 having the illuminance sensor 13 mounted thereon is placed as parallel to the end face of the optical fiber 12 as possible.

Thus, the substrates 32, 35, and 37 having functions for use in the measurement are disposed around the battery 38 while exposing the substrate 33 having a pressure sensor 14 and connectors 15 mounted thereon on the upper surface of the housing 11. In addition, the illuminance sensor 13 is disposed at the left end of the substrate 37 surrounding the battery 38, which enables a reduction in the overall size of the measurement device 1d.

Third Embodiment

With regard to a measurement device according to a third embodiment, the following mainly describes differential features from the above-described measurement device 1, and the description of the same features will be omitted.

Figure 8:
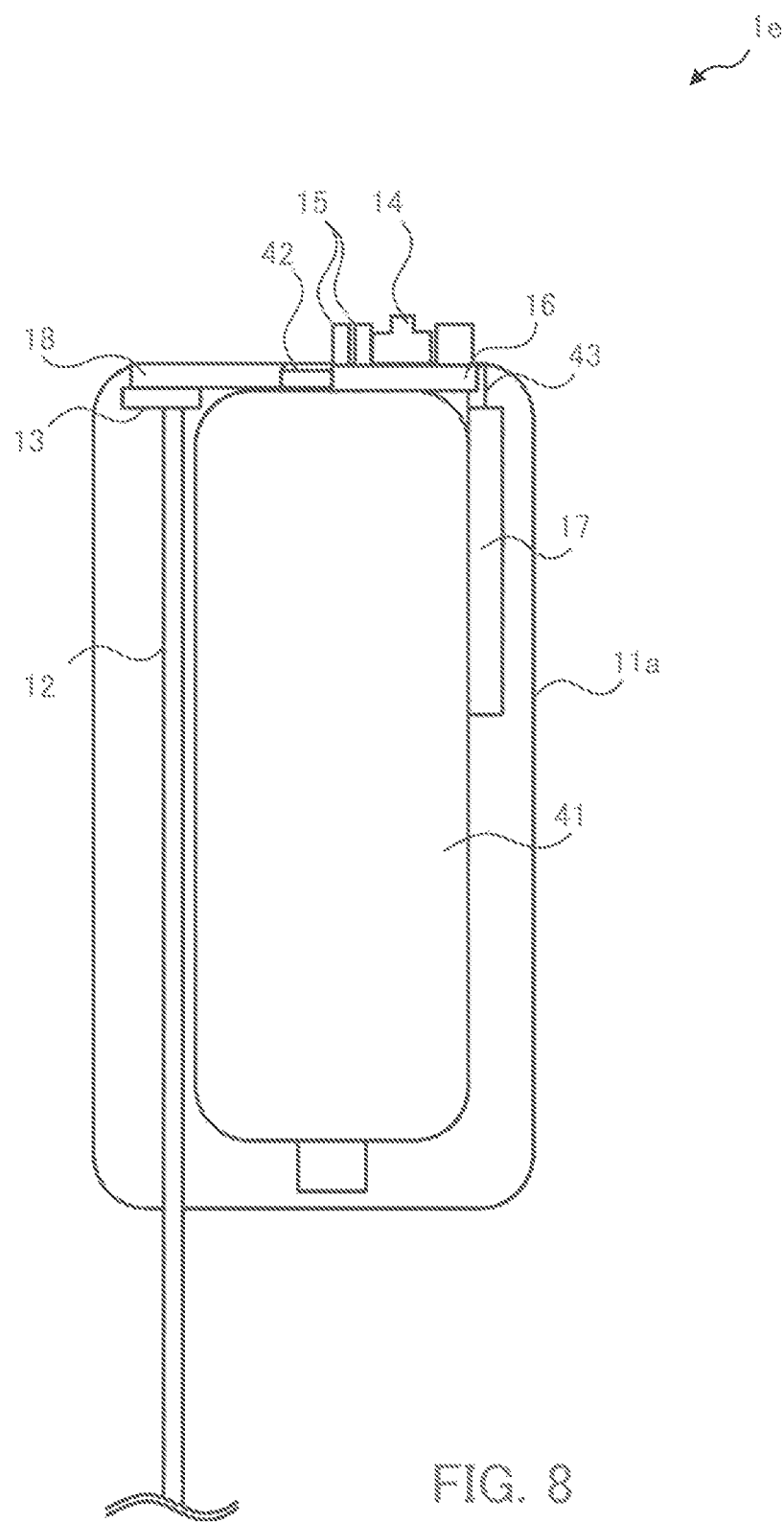
FIG. 8 illustrates a measurement device according to a third embodiment.

FIG. 8 illustrates the measurement device according to the third embodiment.

The measurement device 1 of the first embodiment includes the batteries 19 and 20 under the substrates.

The measurement device of the third embodiment, however, includes substrates around a battery.

It is assumed that a battery 41 disposed in a housing 11a illustrated in FIG. 8, which is larger than the housing 11, is larger in size than the batteries 19 and 20.

The measurement device 1e includes substrates 16, 17, and 18 around the battery 41. A flexible part 42 electrically connects substrates 16 and 18. A flexible part 43 electrically connects the substrates 16 and 17. Even this configuration makes it possible to dispose the substrates having a large area in a limited space. In addition, the large substrate area enables forming many circuits. As a result, it is possible to achieve the measurement device 1 with many functions while downsizing the measurement device 1.

Heretofore, the measurement devices have been described in the embodiments illustrated. The configurations of the disclosed measurement devices are not limited to those illustrated, and the components of the measurement devices may be replaced with other components having equivalent functions or other components. In addition, other desired configurations and steps may be added.

Further, two or more desired configurations (features) in the above-described embodiment may be combined.

According to one aspect, it is possible to downsize a device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

The invention claimed is:

1. A measurement device including a sensor, the measurement device comprising:
   a cylindrical housing;
   an optical fiber disposed along a long-side direction of the housing, the optical fiber having one end disposed in the housing and another end disposed outside the housing;
   a first substrate including a light receiving unit disposed on an extension of the one end in the housing; and a second substrate disposed at an acute angle or a right angle with respect to the first substrate.

2. The measurement device according to claim 1, wherein the second substrate is connected to the first substrate via a flexible part having flexibility.

3. The measurement device according to claim 1, further comprising:
a third substrate on which a connector is mounted and which is connected to the second substrate at an acute angle or a right angle with respect to the second substrate, the connector being used for reading and writing information on a memory provided on the first substrate or the second substrate, the connector being exposed from an end in the long-side direction of the housing.

4. The measurement device according to claim 3, wherein the first substrate, the second substrate, and the third substrate are arranged in Z-shape in a side view.

5. The measurement device according to claim 1, further comprising:
a third substrate on which a pressure sensor is mounted and which is connected to the second substrate, the pressure sensor being exposed from an end in the long-side direction of the housing.

\* \* \* \* \*